United States Patent [19]

Shiomi et al.

[11] 4,194,760

[45] Mar. 25, 1980

[54] WHEEL CAMBER ADJUSTING MEANS FOR VEHICLES

[75] Inventors: Masanao Shiomi; Yuuji Yokoya; Motowo Harata, all of Toyota, Japan

[73] Assignee: Toyota Jidosha Kogyo Kabushiki Kaisha, Toyota, Japan

[21] Appl. No.: 837,682

[22] Filed: Sep. 29, 1977

[30] Foreign Application Priority Data

Apr. 18, 1977 [JP] Japan .............................. 52-47742[U]

[51] Int. Cl.² ............................................. B62D 17/00
[52] U.S. Cl. ..................................... 280/661; 280/668
[58] Field of Search ......................... 280/661, 668, 663

[56] References Cited

U.S. PATENT DOCUMENTS

| | | | |
|---|---|---|---|
| 2,772,596 | 12/1956 | Trussell | 280/661 |
| 2,978,253 | 4/1961 | Weiss | 280/661 |

FOREIGN PATENT DOCUMENTS

| | | | |
|---|---|---|---|
| 455094 | 1/1928 | Fed. Rep. of Germany | 280/661 |
| 2327609 | 12/1974 | Fed. Rep. of Germany | 280/661 |

*Primary Examiner*—John P. Silverstrim

[57] ABSTRACT

Disclosed is a wheel camber adjusting means for use with strut type suspension means for vehicles wherein a pair of arms of a bracket mounted on the lower end of a shock absorber strut are overlapped upon one end of a knuckle arm connected at the other end to a tip end portion of a lower arm through a ball joint. The pair of arms are pivotally connected to the knuckle arm by means of at least a connecting bolt arranged substantially in the longitudinal direction of the vehicle. The bracket is connected to the knuckle arm at a position vertically spaced from the connecting bolt by means of an adjusting bolt arranged in substantially the lateral direction of the vehicle.

7 Claims, 8 Drawing Figures

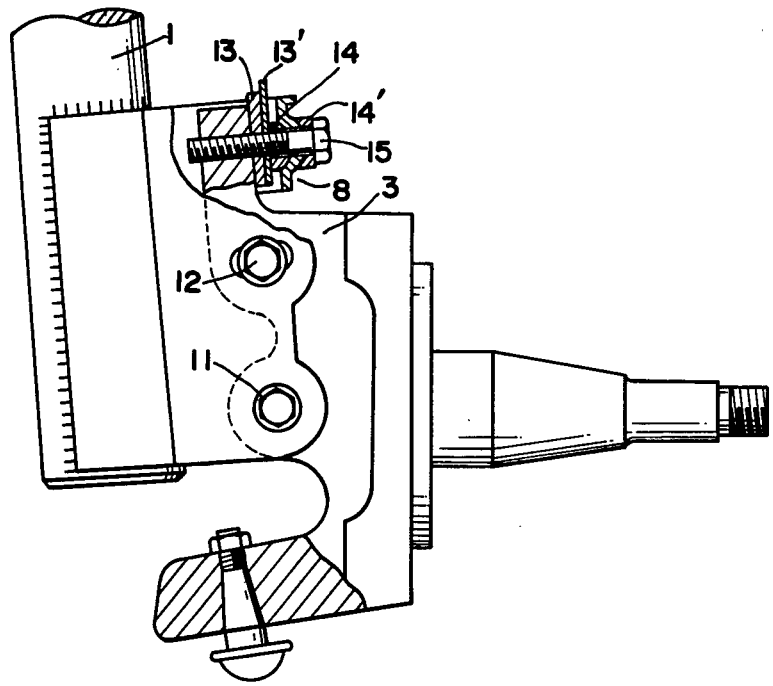
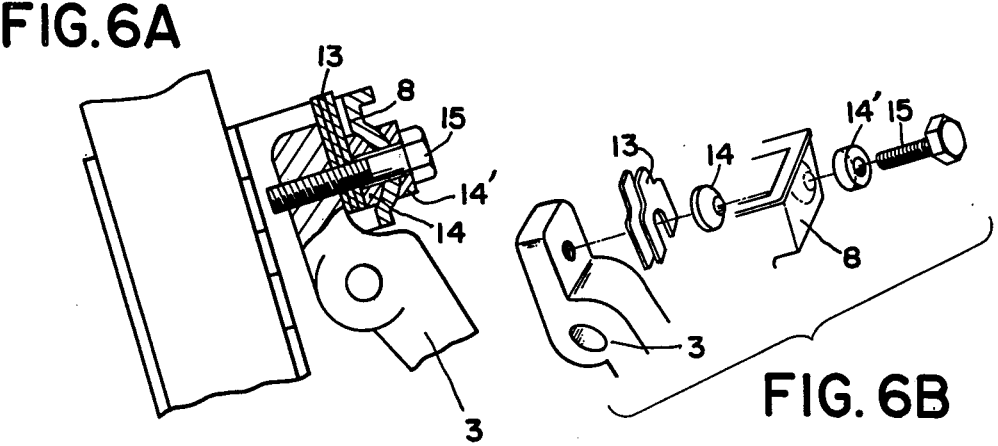

WHEEL CAMBER ADJUSTING MEANS FOR VEHICLES

BACKGROUND OF THE INVENTION

1. Field of the Invention

This invention relates to an improvement in suspension means for use in vehicles, and more particularly to a wheel camber adjusting means for use with a Mc. Pherson strut type suspension means.

2. Description of the Prior Art

In the Mc. Pherson strut type suspension of vehicles, the wheel alignment thereof causes problems such as partial wear of the tire resulting from, for example, improper wheel alignment due to, for example, distortions of the wheel body which originate in standard deviations at the time of wheel attachment, use of the wheel with years, etc. This requires correction of the toe-in, caster and camber of the attached wheel. With respect to the toe-in and caster corrections, a variety of means are usually employed therefor and the goal to make such corrections is reached. With respect to the camber correction, however, there may be a failure to make such correction, due to a geometric construction of the suspension means. Namely, the operation for such correction is followed by the adjusting operation for the associated mechanisms, other than mechanisms for such correction, of the suspension means. Therefore, the camber setting operation becomes complicated and much time is needed to carry it out.

As one of the existing or preceding countermeasures to remedying such drawbacks a suspension means is provided which is of the type wherein extended portions designed to abut on each other within a vertical flat plane substantially parallel to the lateral direction of the vehicle are provided on the lower end of the shock absorber and on the knuckle arm, respectively; and both said extended portions are overlapped upon and pivotally connected to each other through one pair of two pair of holes formed through the extended portions. The position of one of the extended portions relative to the other is changed by using an eccentric connection means passed through the other pair of said two pairs of holes through an eccentric circular plate, to thereby carry out the camber change or correction. According to the suspension means having such structure, the extent of camber adjustment is determined by imparting a desired, corresponding eccentricity to the eccentric circular plate. However, this movement results in an increase in size of the overlapped extended section having such eccentric circular plate incorporated therein. Further, according to in the prior art suspension means, a violent, vertical and repetitive load applied onto the extended section is sustained or resisted by the shearing strength of connecting bolts therefor and the frictional force between the two components thereof. But a fixing moment about the extended section resulting from the offset between the point of application of a load produced from contact of the wheel with the ground and the overlapped extended section has to nullified by the lateral couple of forces of both the connecting bolts which are the same in magnitude and opposite in direction. This would be of help to further the tendency of one component of the overlapped section to move relative to the other within the plane of overlapping and furthermore become a factor to cause a variation in the setting amount of camber.

SUMMARY OF THE INVENTION

Accordingly, the object of the invention is to provide a wheel camber adjusting means which, for the purpose of remedying the above-mentioned conventional drawbacks and making only camber substantially quantitatively adjustable without jacking the vehicle up and without affecting the alignment of the associated mechanisms, is constructed such that a bracket having a pair of arms having at least a pair of connecting holes is fixed to a lower end of a shock absorber strut; the bracket is overlapped upon one end of a knuckle arm connected at the other end to a tip end portion of a lower arm through a ball joint; and said bracket is connected through a shim to the knuckle arm at a position vertically spaced from a connecting bolt fitted through the overlapped portions, by means of a bolt arranged substantially at right angles to the arrangement direction of said connecting bolt, thereby to obtain a desired camber alignment.

The present invention, through the use of said structure, permits an extremely simple and easy adjustment of the wheel camber only by the insertion or removal of the shim and the fastening or loosening of the connecting bolt and yet permits a quantitative adjustment of the wheel camber by utilizing a shim having a predetermined thickness, thereby not only to prevent a partial wear of the tire due to, for example, a failure in the camber alignment but also to cause an increase in the operability and stability of the vehicle. Further, the present invention, through the use of said structure, permits the compensation of manufacturing and mounting tolerances of the respective parts, to thereby enhance the quality of the vehicle.

BRIEF DESCRIPTION OF THE DRAWINGS

FIGS. 1 through 6 are views of a wheel camber adjusting means according to a first embodiment of the invention; and, more specifically FIG. 1 is an elevational view, partly cut away partly in section, of the wheel camber adjusting means installed, FIG. 2 is a perspective view of a knuckle arm, FIG. 3 is an exploded, perspective view illustrating the manner of connecting the knuckle arm to a bracket secured to a lower end of a shock absorber strut, FIG. 4 is a perspective view of the bracket shown in FIG. 3, FIG. 5 is an elevational view, partly cut away and partly in section, of the wheel camber adjusting means assembled, FIGS. 6A and 6B are side elevational and a is a exploded view respectively, illustrating the manner of performing the camber adjustment.

DESCRIPTION OF THE PREFERRED EMBODIMENTS

A detailed description of the invention will be given below with reference to the attached drawings.

Figure 1:
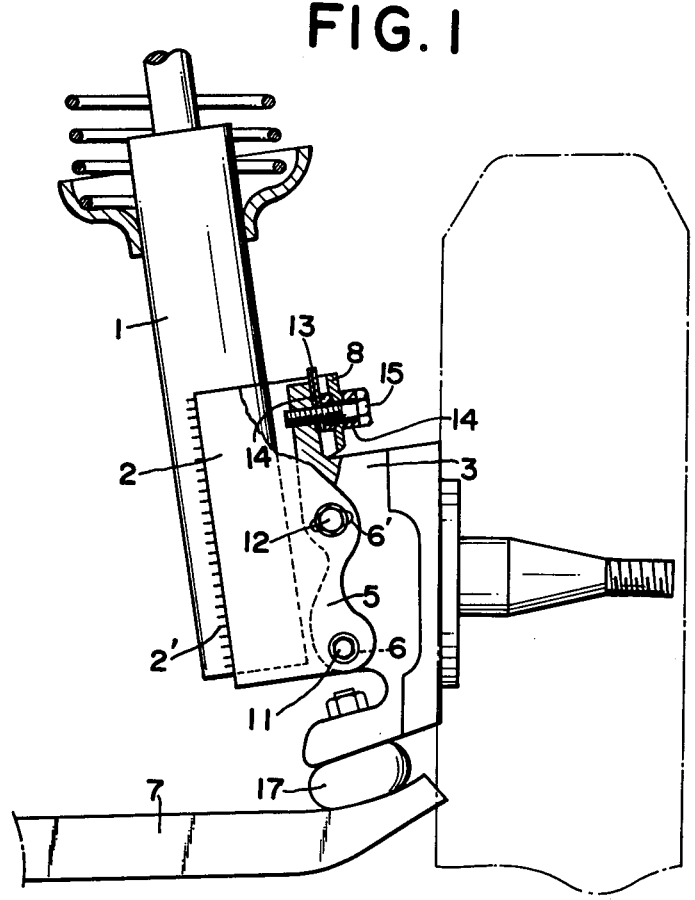
Figure 2:
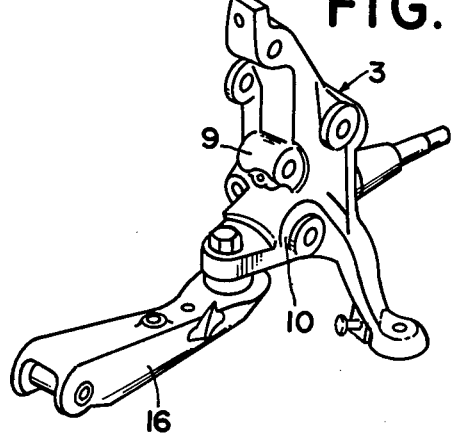
Figure 3:
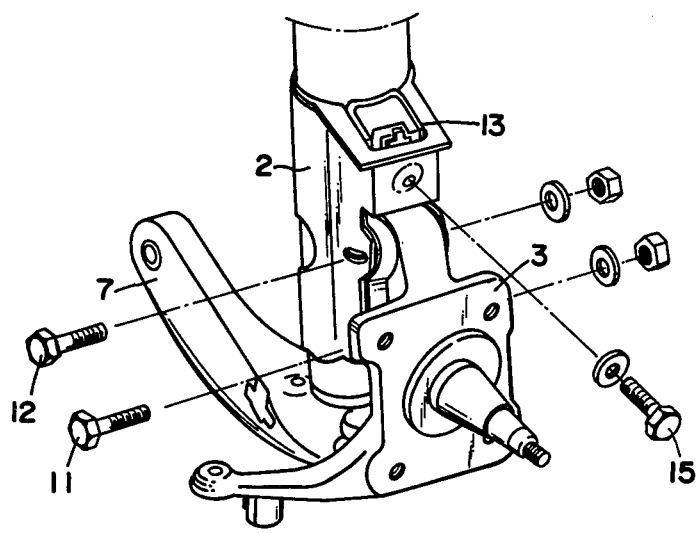
Figure 4:
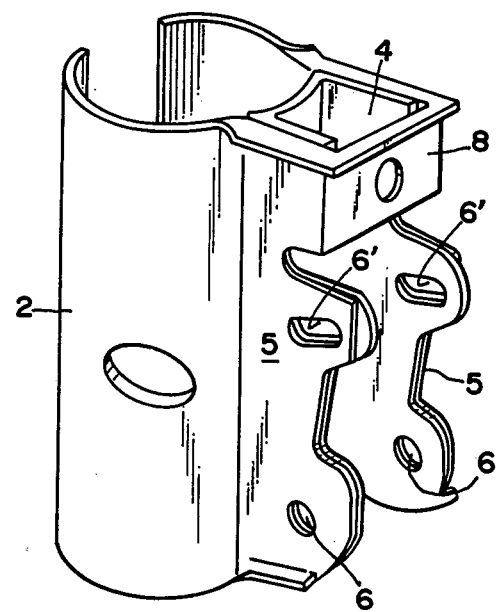
Figure 8:
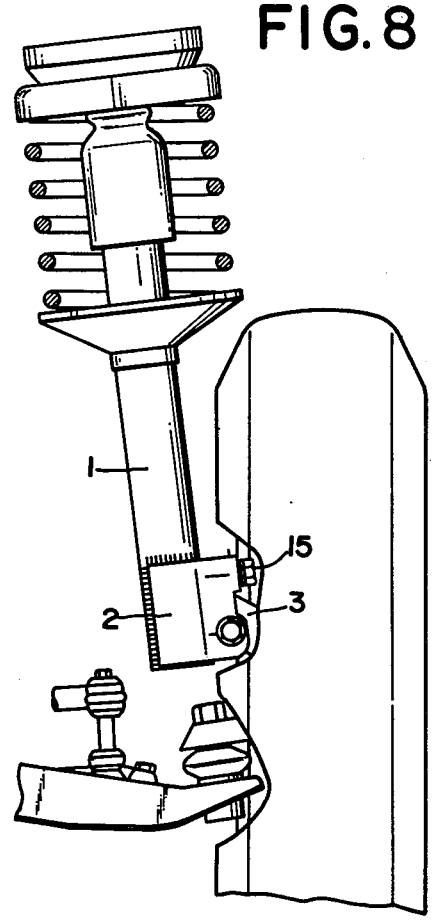
FIGS. 7 and 8 are an elevational view of a wheel camber adjusting means according to an elevational second embodiment of the invention and a view, partly cut away, of the wheel camber adjusting means assembled, respectively.

FIGS. 1 through 6 show a camber adjusting means according to a first embodiment of the invention. In the framework of the present camber adjuster shown in FIG. 1 a bracket 2 having a pair of arms 5 is fixed to a lower portion of a shock absorber strut 1. An arm 3 is fastened to the bracket 2 by means of bolts 12, 11 disposed above and below each other, respectively, in the longitudinal direction of the vehicle. The bracket 2 and knuckle arm 3 are connected to each other at their apex or upper end portions by means of a bolt 15 through shims 13 so as to permit the position of the knuckle arm 3 to be adjusted relative to the position of the bracket 2. Further, a lower arm 7 is connected to the knuckle arm 3 through a ball joint 17. Each arm 5 of the bracket 2 is provided with a pair of connecting holes 6', 6, which are disposed above and below each other, respectively, as shown in detail in FIG. 4. The bracket 2 is further provided with an abutment section 8 at its upper portion, the abuttment section 8 being intended to attach the knuckle arm 3 thereto so as to permit the knuckle arm 3 to be adjusted. The bracket 2 is fixed to the lower portion of the shock absorber strut as shown in FIG. 1 by, for example, welding indicated by a numeral 2'. The bracket 2 can be easily manufacture by, for example, press molding. The knuckle arm 3 is provided with boss portions 9, 10 as shown in detail in FIG. 2, the boss portions being located so as to match with the connecting holes 6', 6 of the arm 5 of the bracket 2, respectively. The knuckle arm 3 is connected to the arm 5 through the boss portions by means of the bolts 12, 11. It will be seen that the bracket 2, for the purpose of having a higher mechanical strength and for convenience of the working operation, is so constructed as to be fitted with an insert member 4 such as shown in FIG. 4. The lower bolt 11 pivotally connects the knuckle arm 3 to the bracket 2 and carries a load transmitted from the vehicle wheel, while the upper bolt 12 is movably fitted into the connecting holes 6', 6' which are formed as arcuate slots, and which are each provided in the arm 5 of the bracket 2 as shown in FIG. 4 and the size of each of which is the same as that formed about the axis of the bolt 11. In the abutment section 8 provided on the upper part of the bracket 2, the knuckle arm 3 and bracket 2 are connected to each other by means of the adjusting bolt 15 through the shims 13, 13' and spherical fittings 14, 14' as later described in detail by reference to FIG. 6. As seen from the illustrations of FIGS. 3 and 5, the connection of the nuckle arm 3 with the bracket 2 is effected by means of the bolts 11, 12 that extend in the longitudinal direction of the vehicle and by means of the bolt 15 substantially at right angles thereto. Referring to FIG. 5, the numeral 13 denotes a standard shim, 13' an adjusting shim, 14 a convex spherical fitting or washer, and 14' a concave spherical fitting or washer. The knuckle arm 3 is allowed to abut on and be connected to the abutment section 8 of the bracket 2 by means of the adjusting bolt 15 with the curved face of the abutment section 8 of the bracket 2 being sandwiched from both sides between the convex and concave spherical wachers 14, 14'.

The adjusting operation for the camber adjusting means shown in the above first embodiment of the invention is as follows. With the vehicle kept in contact with the ground, first the upper connecting bolt 12 and then the adjusting bolt 15 are loosened. The lower connecting bolt 11 is slightly loosened to such an extent as to permit a relative movement of the knuckle arm 3 with respect to the bracket 2 about the bolt 11. Under this condition, the knuckle arm 3 inserted in the upper, box-shaped abutment section 8 of the bracket 2 tends to disengage at its upper portion from the abutment section 8 of the bracket 2 due to the action of a moment about the lower bolt 11 which results from the reaction force from the ground, whereby the inner side face (the side at which the shims are inserted) of the abutment section 8 of the bracket 2 tends to naturally disengage from the rear side face (the shim inserted side) of the upper portion of the knuckle arm 3 are simultaneously with the loosening of the adjusting bolt 15. Where it is desired to cause an increase in caster, in FIG. 6 the adjusting shim 13' is inserted from above between the standard shim 13 and the flattened face of the convexed spherical washer 14 and then the adjusting bolt 15 is fastened. Conversely, where it is desired to cause a decrease in caster, the adjustment can be made by causing a decrease in the installed shim thickness. After this adjustment, the connecting bolts 15, 11 and 12 are fastened. In the above case, the upper connecting bolt 12 is moved through the arcuate slots 6' simultaneously with the insertion of the adjusting shim 13' between the standard shim 13 and the convex spherical fitting 14, so that the movement of the knuckle arm 3 relative to the abutment section 8 of the bracket 2 is subject to no interruption. However, when a caster change is effected as above, the relative angle between the respective abutment portions of the knuckle arm and the bracket 2 is varied in corresponding relation to such castor change. Such variation in said relative angle, however, is reduced to zero utilizing the spherical fittings 14, 14' as shown in the above first embodiment. Thus, the adjusting bolt 15 is fastened reliably.

Figure 7:
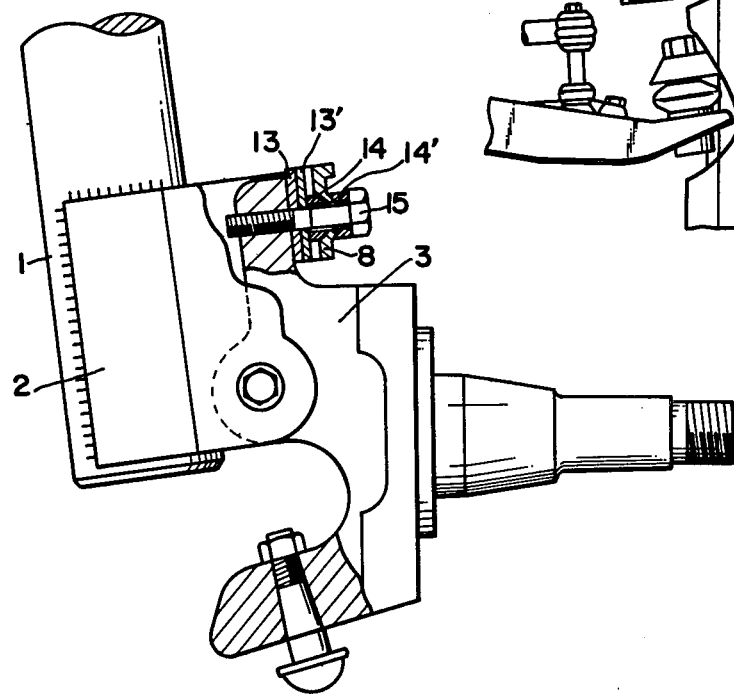

FIG. 7 shows the camber adjusting means according to a second embodiment of the invention which is substantially the same in construction as that described in the above-mentioned first embodiment, except that in the first embodiment the bolt 11 for pivotal connection of the knuckle arm 3 to the bracket 2 and the reinforcing bolt 12 for permitting an increase in the connecting strength, i.e., two bolts, are used as the bolts for connection between the knuckle arm 3 and the bracket 2, while in the second embodiment only one bolt for said pivotal connection is used with omission of the reinforcing bolt. The adjusting operation for the camber adjusting means according to the second embodiment of the invention and the function thereof are omitted from being described.

The overlapping portion of the present camber adjusting means, if the structural construction of the suspension permits, can be constructed, by inverting the order of arrangement, shown in the said embodiments, wherein the point of pivotal connection is provided below the point of adjustment, to thereby provide the pivotal connection point above the adjustment point, so that the components of the said overlapping portion may be separated, simultaneously with the loosening of the adjusting bolt, from each other at the shim inserting portion due to the action of a moment about the pivotally connecting bolt resulting from the reaction force from the ground.

In the above-mentioned embodiments, the upper portion of the knuckle arm is inserted into the box-shaped section of the bracket in such a manner as to be embraced by the section, whereby the knuckle arm and the bracket are connected to each other at the side spaced from each other by the reaction force from the ground. For this reason, the adjustment of the wheel camber can be very easily performed without jacking the vehicle up. Further, according to the invention, when a relative movement of the knuckle arm to the bracket is caused for some reason or other, idle-movement noises, in accompaniment with the car movement, are generated, due to the resulting creation of an idle space between the upper portion of the knuckle arm and the box-shaped upper section of the bracket, in between both. For this reason, the present camber adjusting means has the effect that it can be utilized as a sensor of said relative movement.

Further, according to the invention, a spherical face is formed, by press-forming, at that portion of the box-shaped section of the bracket which is allowed to directly abut against the knuckle arm; and the convex and concave spherical fittings matching respectively with said spherical face of said box-shaped section are sandwich said spherical face from both sides thereof. For this reason, the camber adjusting means can be formed into a compact structure simple in construction and easy to manufacture, and can zero the variation in the relative angle between the bracket and the knuckle arm due to a change in camber, to thereby permit the reliable fastening of the adjusting bolt, to thus dissipate a fear that it might be loosened.

What is claimed is:

1. A vehicular wheel camber adjusting mean for use with a Mc Pherson-type strut suspension which includes a shock absorbing strut having an outer cylinder, the strut being resiliently secured proximate the upper end thereof to a structural part of the vehicle, a coil spring surrounding the strut, the coil spring being located and acting between the upper end of the strut and the upper end of the outer cylinder, a lower arm having one end thereof connected to a structural part of the vehicle, the other end of the lower arm including a ball joint and a knuckle arm having one end thereof connected to the ball joint, said adjustment means comprising a bracket coupled to the outer cylinder proximate the lower end thereof, said bracket having a pair of arms integral therewith and first and second connecting holes through each said arm, said first connecting hole in each said arm being slotted, a portion of the knuckle arm being positioned between said pair of arms of said bracket and secured thereto by means of first and second connecting bolts each having a longitudinal axis extending through said first and second connecting holes, respectively, in the longitudinal direction of the vehicle, there being further included an adjusting bolt and at least one shim vertically spaced from said connecting bolts for coupling said bracket to the knuckle arm portion, the longitudinal axis of said adjusting bolt being substantially at a right angle to the longitudinal direction of the vehicle said adjusting bolt extending loosely through said bracket and being threaded into the knuckle arm whereby when said adjusting bolt is axially displaced the knuckle arm portion will pivot about the longitudinal axis of said second connecting bolt and said first connecting bolt will move within said slotted first connecting hole.

2. A wheel camber adjusting means according to claim 1, wherein said adjusting bolts is disposed above said connecting bolt.

3. A wheel camber adjusting means according to claim 2 including a convex spherical fitting and a concave spherical fitting through which said adjusting bolt extends.

4. A wheel camber adjusting means according to claim 3, wherein said upper end of said bracket, and said upper end of said knuckle arm portion, are formed into a box like shape and into a shape permitting the insertion of said knuckle arm portion into said box like shape, respectively.

5. A wheel camber adjusting means according to claim 4, wherein an outer face of said box-shaped upper end of said bracket comprises a spherical face; and said convex and concave spherical fittings are disposed in a manner sandwiching said spherical face of said bracket from both sides thereof.

6. A wheel camber adjusting means according to claim 5, wherein said adjusting bolt passes through said concave fitting, a portion of said bracket; said convex fitting, said at least one shim and the upper end of said knuckle arm portion in the order mentioned.

7. A wheel camber adjusting means according to claim 1, wherein said bracket further comprises a main body formed of steel sheet and an attaching and reinforcing insert fitted into said main body, lower end of said shock absorber strut.

* * * * *